(12) United States Patent
Eves et al.

(10) Patent No.: US 7,164,820 B2
(45) Date of Patent: Jan. 16, 2007

(54) ELECTRO-OPTIC FILAMENT OR FIBRE

(75) Inventors: David A. Eves, Crawley (GB); Jeffrey A. Chaman, Burgess Hill (GB); Hans-Helmut Bechtel, Roetgen (DE); Philippa C. Wagner, London (GB); Yourii Martynov, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 10/539,690

(22) PCT Filed: Dec. 8, 2003

(86) PCT No.: PCT/IB03/05936

§ 371 (c)(1),
(2), (4) Date: Jun. 16, 2005

(87) PCT Pub. No.: WO2004/055576

PCT Pub. Date: Jul. 1, 2004

(65) Prior Publication Data

US 2006/0067621 A1 Mar. 30, 2006

(30) Foreign Application Priority Data

Dec. 17, 2002 (GB) .................................. 0229316.5

(51) Int. Cl.
*G02B 6/26* (2006.01)

(52) U.S. Cl. .............................. 385/40; 385/15; 385/39

(58) Field of Classification Search .................. 385/15, 385/39, 40
See application file for complete search history.

(56) References Cited

U.S. PATENT DOCUMENTS

| 5,906,004 | A | 5/1999 | Lebby et al. |
| 6,096,666 | A | 8/2000 | Jachimowicz et al. |
| 6,602,544 | B1 * | 8/2003 | Piselli .......................... 427/128 |

FOREIGN PATENT DOCUMENTS

| EP | 0 933 752 | 8/1999 |
| EP | 1 213 594 | 6/2002 |

* cited by examiner

*Primary Examiner*—Jennifer Doan

(57) ABSTRACT

In the field of flexible displays there is a need for an electro-optic filament that is capable of being woven, knitted or crocheted. An electro-optic filament or fibre (10) includes an elongate core (11) extending lengthwise within a volume (12) of polarisable material; and an outer electrode member (13) overlying the volume (12). The core (11) and outer member (13) are electrically conducting and connectable to electrical potentials to generate a radial field in the polarisable material. The outer member (13) is optically transmissive and/or transflective. The polarisable material (12) exhibits an optical effect such as a colour change, change in polarisation or change in reflectivity, when subjected to a said field or a change in a said field. The filament or fibre may readily be woven into eg. a fabric or a garment, using conventional textile processing machinery.

17 Claims, 4 Drawing Sheets

ELECTRO-OPTIC FILAMENT OR FIBRE

This application is a National Filing pursuant to 35 U.S.C. 371 based upon International Application No. PCT/IB03/05936, filed Dec. 8, 2003.

This invention relates to an electro-optic filament or fibre, especially one that is suitable for inclusion in a fabric or a garment with the aim of producing optically detectable effects therein.

The last 30 years have seen wide-ranging research and development in electro-optic displays. This work has been so extensive that such displays are now commonplace in a wide range of everyday items such as laptop computers, photocopiers, printers, handheld devices (such as "personal digital assistants"), telephones, media-reading machines such as CD players and DVD players, portable televisions and retail point-of-sale devices. The invention is useable in all such displays, and in a wide variety of further devices including but not limited to those disclosed hereinbelow.

For a considerable part of the last 30 years the research effort has focused on producing flat, rigid displays that in use appear substantially two-dimensional to the viewer.

One reason for the historical emphasis on flat, rigid displays derives from the popularity of liquid crystal materials in such displays.

The liquid state of such materials has led to a tradition of confining liquid crystal material between glass plates, in order to maintain structural integrity of a display after manufacture. Also the known liquid crystal display structures can be made in a reliable fashion if produced in this manner.

Latterly, however, there has been growing interest in the subject of flexible displays.

Such displays are potentially foldable, whereby for example the display screen of a device such as a laptop computer is storable in a considerably smaller space than the currently known displays.

Also a flexible display can conform to the contours of an irregularly shaped substrate. This opens the possibility of locating displays in a wide variety of locations that previously have been unsuitable for such purposes.

One example of a composite display material proposed for use in a flexible display is disclosed in EP-A-0 933 752.

In this disclosure a plurality of rotatable microspheres are suspended in an array in a flexible medium that is sandwiched between flexible, light-transmitting electrode sheets.

The microspheres are coated during manufacture so that opposite sides thereof exhibit optically distinct characteristics. For example, one side of each microsphere may be highly reflective by virtue of coating with a white pigment such as $TiO_2$; while the opposite side of each microsphere may include a coating that absorbs light in a predetermined range of wavelengths.

The core of each microsphere is polarisable, as a result of its chemical structure. Therefore the application of selected potentials to the transparent electrode sheets causes rotation of the spheres relative to the supporting medium whereby the appearance of the display is variable. The use of appropriate addressing software allows the generation of differing effects in distinct parts of the display, whereby it is possible to generate chosen images and patterns.

The composite structure disclosed in EP-A-0 933 752 is sufficiently thin to be flexible and in some ways to resemble paper.

Another flexible display is so-called "electronic ink" manufactured by E-ink Corporation (www.eink.com).

In this technology, as in EP-A-0 933 752, a plurality of microspheres is suspended in an array in a flexible medium sandwiched between transparent electrode sheets or layers.

In each microsphere there is a plurality of charged particles. Typically there would be positively and negatively charged particles within each microsphere, whereby on the generation of an electric field by virtue of energising of the electrode sheets the positively charged particles migrate to one side of each microsphere; and the negatively charged particles to the opposite side. The respective groups of particles are differently coloured (or otherwise optically distinct). By controlling the potentials applied to the electrode sheets it is possible to generate optical effects in the display.

While the foregoing displays provide for the basic requirement of flexibility, they are somewhat inconvenient to incorporate into some classes of product.

In particular, it is difficult to incorporate such displays into items such as fabrics and garments that have complex shapes and/or structures. Probably the only way of incorporating the aforementioned displays into such structures is to produce the displays in sheet form and adhere them to pre-existing fabrics. This might involve compromises in the design and/or manufacture of such articles.

Therefore it is an aim of the invention to provide an electro-optic subcomponent that is capable of being an integral part of eg. a fabric or a garment, whereby the design and/or manufacture thereof involves considerably less compromise than hitherto.

According to the invention in a first aspect, there is provided an electro-optic filament or fibre comprising an elongate core within a volume of polarisable material, and an outer member overlying the said volume, wherein:

(i) the core and the outer member are electrically conducting and respectively connectable to electrical potentials to generate a field therebetween; and (ii) the polarisable material exhibits an optical effect when subjected to a said field and/or a change in a said field, the said optical effect being visible or otherwise optically detectable externally of the filament or fibre.

Conveniently the outer member is optically transmissive and/or transflective.

In any event, in preferred embodiments of the invention the subcomponents of the filament or fibre are flexible whereby the filament or fibre as a whole is flexible.

Such a filament or fibre may, at the option of a designer, be eg. woven, knitted, crocheted, seam stitched, overlooked, embroidered or otherwise interlaced with further fibres (that may or may not have the same structure as the filament or fibre of the invention) thereby producing a fabric and/or a garment.

Alternatively a filament or fibre according to the invention may be adhered to another structure by any of a range of means, thereby producing eg. a sheet-like display or simply even a region of electro-optic display filaments or fibres adhered to a surface.

Conveniently the core is or includes a flexible rod made of or from a material selected from the list including:

an electrically conducting metal;

an electrically conducting polymer;

a polyamide coated with a conducting material; or combinations of two or more aforesaid materials.

In one arrangement the outer member includes a surface adjacent which the said volume of polarisable material lies.

Preferably the outer member surrounds the said volume of polarisable material, whereby the filament or fibre is inherently interlacable with other fibres for the purpose of manufacturing a fabric or garment.

However, for the avoidance of doubt, the outer member need not encircle or surround the remainder of the filament or fibre in all embodiments of the invention.

In any event the outer member and the said volume preferably are adhered one to the other, thereby conferring structural strength and integrity on the filament or fibre.

Weaving, knitting, crocheting or interlacing of the filament or fibre with other fibres, and the manufacture of the filament or fibre, are advantageously facilitated by the preferred feature of the filament or fibre being of generally circular cross-section. The core, the volume of polarisable material and the outer member preferably are generally mutually concentric and of circular cross-section. Nonetheless, other arrangements of the subcomponents of the invention are possible.

Conveniently the volume of polarisable material includes one or more of:

a liquid crystal material;

a microencapsulated, polarisable ink; or a "twisting ball" composite.

Another possibility is to use polymer and/or conventional LED's. Although these are not "polarisable" in the narrow sense of the aforementioned materials, they are capable of responding to impulses of differing polarity. Consequently they fall within the meaning of "polarisable" in the context of the invention.

By "microencapsulated, polarisable ink" we mean eg. "electronic ink" as described hereinabove.

By "twisting ball composite" we mean a display material of the general kind disclosed in EP-A-0 933 752.

Conveniently the volume of polarisable material includes a pigment, especially an inorganic phosphor pigment; titanium dioxide; or mixtures thereof.

Such pigments are advantageously known to enhance the optical effects producible in electro-optic displays.

Preferably the resistance of the outer member is inhomogeneous. This advantageously allows for variability of the optical effects from place to place along the filament or fibre. In particular, such inhomogeneity of the resistance of the outer member allows for the provision of pixels along the filament or fibre, at electrically addressable locations. Such features facilitate the generation of recognisable images.

It is possible to achieve such inhomogeneity of the resistance of the outer member as a result of one or more of:

(i) one or more discontinuities in the material of the outer member;

(ii) non-uniformity of the thickness of the outer member;

(iii) non-uniformity of the resistivity of the material of the outer member; or (iv) non-uniformity of the composition of the outer member.

These features of the invention are convenient and straightforward to manufacture.

Preferably the core and/or the outer member of the filament or fibre is operatively connected to an electrical potential that varies in dependence on the output or state of a transducer.

This feature of the invention opens the possibility of eg. fabrics and garments for industrial, domestic or entertainment use that are capable of alerting the wearer or another viewer thereof to the prevalence of particular conditions.

For example, a hat incorporating filaments or fibres according to the invention may be arranged to warn of excessive UV exposure in sunny environments; or a ski glove can warn of the temperature conditions likely to result in icing of pistes.

The invention also resides in a self-sustaining structure including one or more filaments or fibres each as defined herein.

Preferably in such a structure the or each said fibre is interlaced with a further fibre, in one or more of the ways described herein.

More specifically, such a structure includes a plurality of filaments or fibres each as defined herein, the filaments or fibres being woven, knitted or crocheted together.

Such a structure is of course manufacturable using conventional textile making techniques and/or apparatuses such as looms and knitting machines.

The invention further resides in a garment including one or more filaments or fibres defined herein; and/or a structure as defined herein.

There now follows a description of preferred embodiments of the invention, by way of non-limiting example, with reference being made to the accompanying drawings in which.

Figure 1:
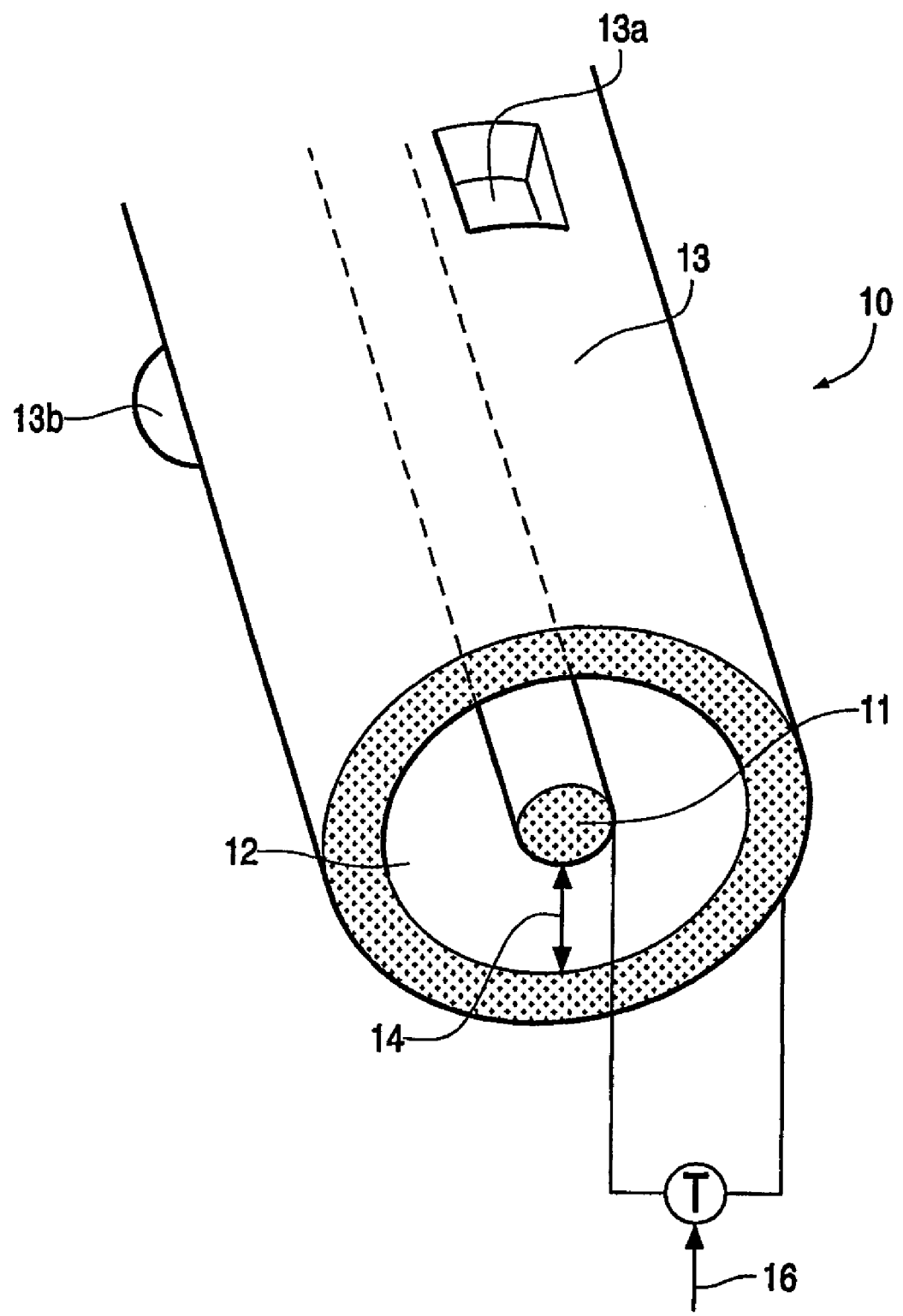
FIG. 1 is perspective view of an embodiment of filament or fibre according to the invention.

Referring to the drawing figure, an elongate, electro-optic filament or fibre 10 comprises an elongate core 11 that lies within an elongate, cylindrical volume 12 of polarisable material. An outer member 13 that is also an elongate cylinder overlies and in the embodiment shown encircles the volume 12.

The core 11 and the outer member 13 are electrically conducting and are respectively connectable to electrical potentials to generate a radially extending electric or magnetic field therebetween.

Outer member 13 is in the embodiment shown optically transmissive and/or transflectve. One suitable material for the manufacture of outer member 13 is a transparent, electrically conducting material such as indium tin oxide (ITO). Other suitable materials include indium zinc oxide (IZO); organic conductive coatings such as polyethylene dioxithiophene (PEDOT); or thin metal layers such as thin silver layers having similar conductivity to ITO. Such layers are transparent to an adequate degree.

Transmission through such layers may be increased by the application of thin interference layers (preferably on both sides). An example is Zinc sulfide (ZnS) on Silver (Ag).

The transparent coatings (interference layers) should have a high index of refraction. The transparent coatings can be applied at one side of the thin metal layer (substrate—metal—coating), or on both sides (substrate—coating—metal—coating). It is also possible to modify the transmission properties further by applying a coating with different transparent layers having alternating high and low indices of refraction. Preferably, the layer sequence always begins with the high index of refraction layer on the metal. Preferred values are n>1.8.

The thin metal layers mentioned have the advantage of being producible at room temperature. This contrasts with the ITO layers, for the preparation of which temperatures of more than 180C may be needed.

Figure 2:
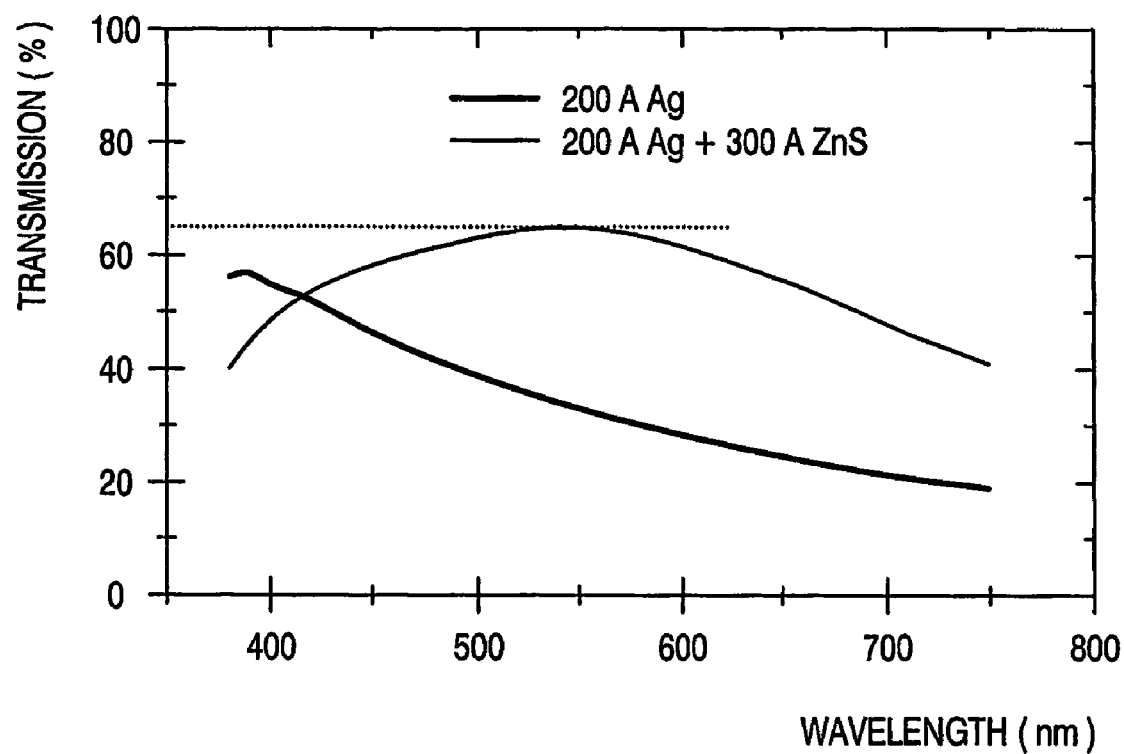
FIG. 2 shows improvements in light transmission through the material of an outer layer, forming part of the invention, through the addition of an interference layer.

When it is desired to produce a continuous coating or layer, a thickness of perhaps 15 nm of the material is needed. ITO at this thickness transmits about 90% of incident light. As shown by FIG. 2, which plots light transmission against wavelength, a 200 angstrom thick layer of silver on the outer member 13 transmits a maximum of about 60% of incident light energy at about 395 nm. By comparison the same thickness of silver coated with a zinc sulphide (ZnS) interference layer that is 300 angstrom thick permits nearly 70% transmission at about 560 nm.

The polarisable material 12 is such as to exhibit an optical effect when subjected to a field as defined herein, or a change in such a field.

"Optical effect" as used herein includes but is not limited to changes in reflectivity, optical transmissivity, polarisation and/or absorption. The optical effect preferably is visible or otherwise optically detectable by reason of the properties of the outer member. However in some embodiments of the invention this need not be so. For example the outer member may be of high reflectivity; or may absorb all or substantially all visible wavelengths in order to achieve particular optical effects.

All the subcomponents of the fibre are in the preferred embodiment shown flexible, whereby the filament or fibre 10 as a whole is flexible. Hence the filament or fibre 13 is interlacable with other filaments or fibres, that may or may not, at the option of the user, have the same structure as that shown in the figure.

Suitable materials for the core 11 include, but are not limited to, an electrically conducting metal; an electrically conducting polymer; a polyamide coated with an electrically conducting material; or combinations of the aforesaid materials.

Particularly suitable materials include eg. solid, flexible copper wire; twisted, multiple copper filaments; copper-coated wires and multiple filament constructions; other fibres or wires plated or otherwise coated with a metal such as copper; polyamide fibre with copper electrolessly plated on it; and steel, multi-filament fibres. In coated or plated fibres or wires, the coating or plating need not be continuous.

Each of the aforementioned constructions of core 11 offers different advantages in terms of flexibility, uniformity and conductivity. Consequently the designer of articles according to the invention has considerable choice as to fibre characteristics.

As shown in the drawing figure, the outer member 13 and the volume 12 are adhered one to another. One way of achieving this is by forming the outer member as a coating on the fibre. In principle this may be done by a dipping process but it could also be applied before the fibre is extruded; or by electroless plating.

Alternatively a method of applying an outer sheath may use elastic force to hold contact or an outer surface could be twisted round as a tape. In these cases a conductive glue eg. silver loaded epoxy might be useful.

It is also possible that the entire fibre could be sheathed in a protective—insulative layer.

As shown, the cross-section of the filament or fibre 10 is circular, whereby the core 11 is an elongate rod; and the volume 12 and outer member 13 are elongate cylinders. Preferably the components of the filament or fibre are concentric since this aids manufacture. It also assists in the production of a uniform, radial electrical or magnetic field 14.

Figure 5:
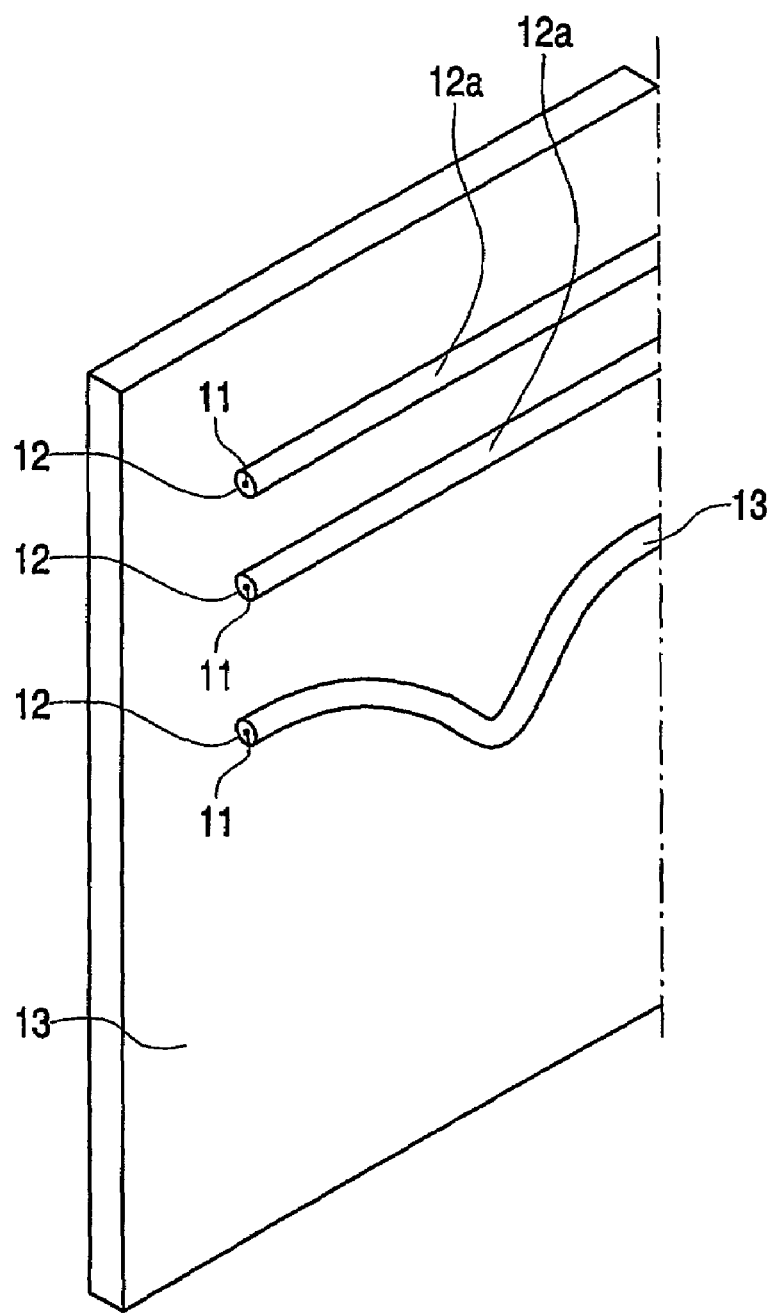
FIG. 5 shows another embodiment of electro-optic device according to the invention.

In another embodiment of the invention shown schematically in FIG. 5, the outer member 13 does not encircle or surround the volume 12 entirely.

In such an embodiment the outer member 13 may be constituted eg. as a transmissive or transflective sheet (such as an ITO-coated clear polymer sheet) or another shape of conducting material adjacent which the volume 12 containing core 11 lies.

The volume 12 may be adhered to such a sheet, or may simply be supported (eg. by virtue of interlacing with other fibres) adjacent such a form of outer member 13.

As illustrated schematically in FIG. 5, a plurality of the volumes 12 may be present, adhered or supported adjacent the outer member 13 in a wide variety of ways and orientations.

FIG. 5 additionally demonstrates that the volume 12 may as necessary be encircled by a sheath 12a that is distinct from member 13. The need for and nature of such a sheath result from the precise fibre construction adopted and the materials needed to form the volume 12.

As noted herein, the volume 12 of polarisable material may include one or more of a liquid crystal material (that may, in turn, be any of several types); a microencapsulated, polarisable ink; or a twisting ball composite.

The polarisable material may include a pigment such as but not limited to an inorganic phosphor pigment (eg.:

| | |
|---|---|
| BAM: Eu | Ba, MgAl10O17: Eu |
| YAG: Ce | Y3Al5O12: Ce |
| ZnS: Ag | ZnS: Ag, Al, Cl |
| ZnS: Cu, Au | ZnS: Cu, Au, Al) | that serves to convert ambient light, act as a brighter and/or give the filament a desired colour; and/or a whitener such as $TiO_2$ or a functionally equivalent pigment.

Mixtures of pigments are possible within the scope of the invention.

In any embodiment of the invention, the resistance of the electrical resistance of the outer member may be inhomogeneous.

As noted this advantageously allows the definition of pixels along the elongate filament or fibre and/or the generation of particular optical effects.

Such inhomogeneity may be the result of discontinuities in the material of the outer member 13, as illustrated schematically at 13a in FIG. 1; or may be the result of non-uniformity of the thickness of the outer member as illustrated schematically at 13b in the figure.

Another possibility is for the resistivity of the material of outer member 13 to vary from place to place therealong.

Yet a further possibility is for the chemical composition of the material of outer member 13 to vary from place to place as aforesaid.

The core electrode 11 and outer member electrode 13 are in preferred embodiments of the invention connectable to electrical potentials that vary in dependence on the output or state of a transducer as aforesaid.

One transducer T is shown schematically connected in FIG. 1. Reference numeral 16 schematically represents driver inputs and system variables influencing the output or state of the transducer T.

A self-sustaining structure according to the invention includes one or more fibres or filaments each as described herein, interlaced with a further fibre or another component. Each further fibre may be as described herein, or may be of a different design.

One advantage of processing the filaments or fibres of the invention in this way lies in the ability to weave, knit or crochet or otherwise interlace the fibres using conventional textile manufacturing machinery such as looms and knitting machines.

Figure 3:
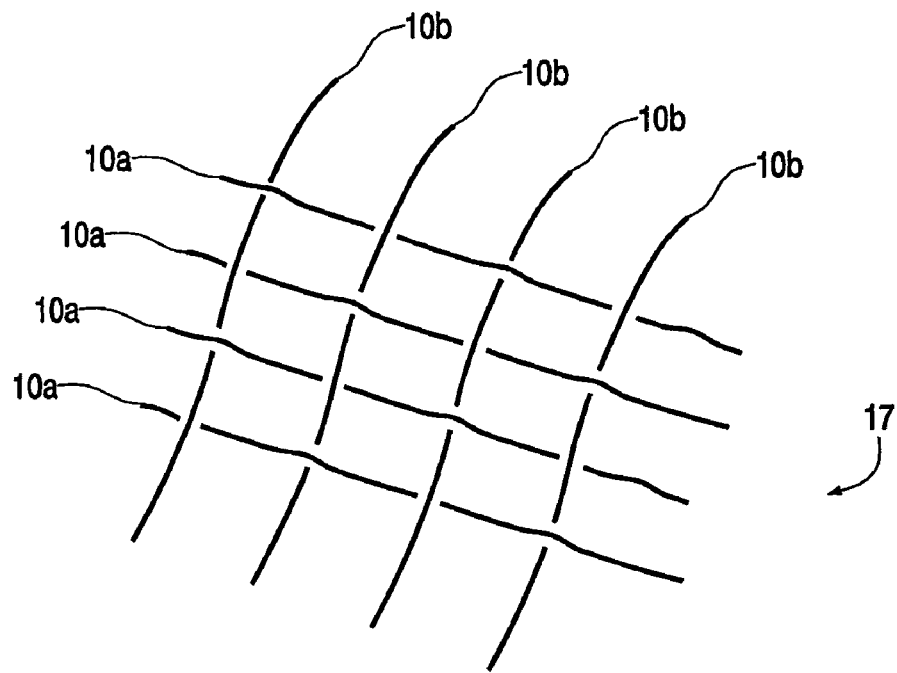
FIG. 3 shows an example of a self-sustaining structure according to an aspect of the invention.

FIG. 3 shows in an exaggerated way a plain woven structure 17 according to the invention formed by interlacing respective fibres 10. Plain weaving is merely the best known of the myriad ways within the scope of the invention in which it is possible to interlace fibres to produce self-sustaining structures.

In the FIG. 3 embodiment the warp fibres are represented by the numerals 10a and the weft fibres by numerals 10b. It is not essential for both the warp 10a and weft 10b fibres to be in accordance with the invention. For example it is possible to confer certain properties on the structure 17 as a whole, if eg. the weft fibres 10b are other than in accordance with the invention.

For the avoidance of doubt however it is equally possible, within the scope of the invention, to produce a structure 17 all of the fibres of which are as described herein.

Figure 4:
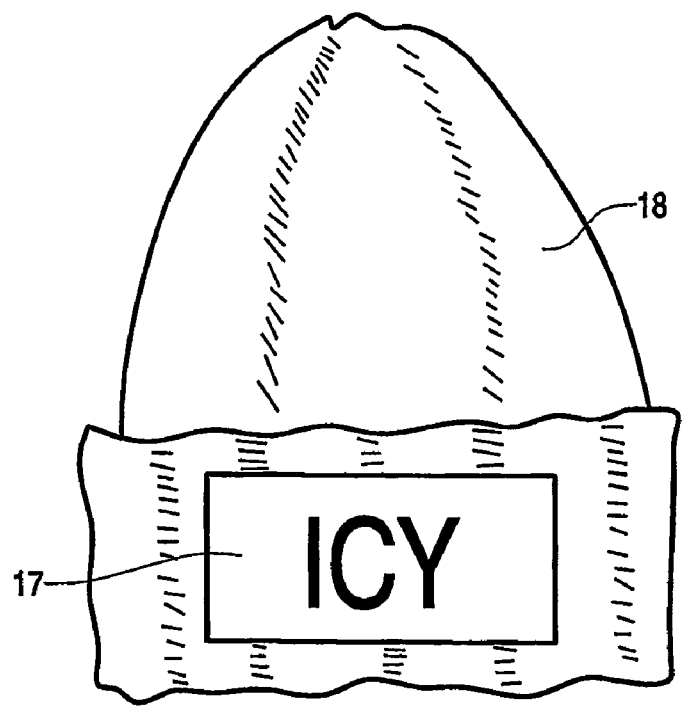
FIG. 4 shows a garment according to the invention.

The structure 17 is shown in FIG. 4 forming part of a garment 18, that in the example is for illustrative purposes shown as a ski hat. When appropriately connected to driver circuits and transducers, the structure 17 may provide for optical effects such as the simple warning shown; or considerably more complex effects.

The structure 17 may be formed integrally with the garment 18; or may exist separately, thereby requiring securing (eg. by stitching or gluing) to the garment.

Structures exemplified by structure 17 may within the ambit of the invention constitute or form parts of eg. soft furnishings, vehicle interiors, bandages, wound dressings, packaging, sails, parachutes and indeed virtually any product in which there is a possibility of using textile components.

The invention claimed is:

1. An electro-optic filament or fibre (10) comprising an elongate core (11) within a volume (12) of polarisable material, and an outer member (13) overlying said volume, wherein:
   (i) the core (11) and the outer member (13) are electrically conducting and respectively connectable to electrical potentials to generate a field (14) therebetween; and
   (ii) the polarisable material (12) exhibits an optical effect when subjected to said field (14) and/or a change in a said field, said optical effect being visible or otherwise optically detectable externally of the filament or fibre (10),
   wherein the resistance of the outer member (13) is inhomogeneous.

2. A filament or fibre according to claim 1, wherein the outer member (13) is optically transmissive and/or transflective.

3. A filament or fibre according to claim 1, whose sub-components are flexible, whereby the filament or fibre (10) is flexible.

4. A filament or fibre according to claim 1, wherein the core (11) is or includes a flexible rod made of or from a material selected from the list including:
   an electrically conducting metal;
   an electrically conducting polymer;
   a polyamide coated with a conducting material; or
   combinations of two or more aforesaid materials.

5. A filament or fibre according to claim 1, wherein the outer member includes a surface adjacent which said volume lies.

6. A filament or fibre according to claim 1, wherein the outer member surrounds said volume.

7. A filament or fibre according to claim 5, wherein the outer member and said volume are adhered one to the other.

8. A filament or fibre, according to claim 6, of generally circular cross-section, wherein the core, said volume and the outer member are generally mutually concentric.

9. A filament or fibre according to claim 1, wherein the volume (12) of polarisable material includes one or more of:
   a liquid crystal material;
   a microencapsulated, polarisable ink; or
   a "twisting ball" composite.

10. A filament or fibre according to claim 9, wherein the volume (12) of polarisable material includes a pigment.

11. A filament or fibre according to claim 10, wherein the pigment is an inorganic phosphor pigment; titanium dioxide; or a mixture thereof.

12. A filament or fibre according to claim 11, wherein the inhomogeneity of the resistance of the outer member (13) results from one or more of:
   (i) one or more discontinuities (13a) in the material of the outer member (13);
   (ii) non-uniformity of the thickness (13b) of the outer member (13);
   (iii) non-uniformity of the resistivity of the material of the outer member (13); or
   (iv) non-uniformity of the composition of the outer member (13).

13. A filament or fibre according to any preceding claim, wherein the core (11) and/or the outer member (13) of which is operatively connected to an electrical potential that varies in dependence on the output or state of a transducer (T).

14. A self-sustaining structure including one or more filaments or fibres (10) each according to claim 1.

15. A structure according to claim 14, wherein the or each said fibres (10) is interlaced with a further fibre.

16. A structure according to claim 14, including a plurality of fibres (10) each according to claim 1 woven, knitted or crocheted together.

17. A garment including one or more filaments or fibres each according to claim 1.

* * * * *